United States Patent
Aikas et al.

(10) Patent No.: US 9,317,523 B2
(45) Date of Patent: Apr. 19, 2016

(54) COMPOSING OBJECTS IN HOSTED STORAGE

(71) Applicant: Google Inc., Mountain View, CA (US)

(72) Inventors: Erkki Ville Juhani Aikas, Seattle, WA (US); Michael F. Schwartz, Boulder, CO (US); Paul E. Newson, Kirkland, WA (US)

(73) Assignee: Google Inc., Mountain View, CA (US)

( * ) Notice: Subject to any disclaimer, the term of this patent is extended or adjusted under 35 U.S.C. 154(b) by 221 days.

(21) Appl. No.: 13/777,632

(22) Filed: Feb. 26, 2013

(65) Prior Publication Data

US 2014/0244700 A1    Aug. 28, 2014

(51) Int. Cl.
G06F 17/30    (2006.01)
G06F 21/62    (2013.01)
H04L 29/06    (2006.01)

(52) U.S. Cl.
CPC .... *G06F 17/30194* (2013.01); *G06F 17/30165* (2013.01); *G06F 21/62* (2013.01); *G06F 21/6209* (2013.01); *G06F 21/6218* (2013.01); *G06F 2221/2141* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 6,230,173 B1 * | 5/2001 | Ferrel et al. | 715/205 |
| 6,539,396 B1 | 3/2003 | Bowman | |
| 7,231,436 B1 * | 6/2007 | Dalfo et al. | 709/223 |
| 7,624,335 B1 * | 11/2009 | Maheshwari et al. | 714/807 |
| 7,702,725 B2 | 4/2010 | Erickson et al. | |
| 7,752,214 B2 | 7/2010 | Pizzorni et al. | |
| 2008/0033969 A1 | 2/2008 | Koo et al. | |
| 2010/0011091 A1 | 1/2010 | Carver et al. | |
| 2011/0289126 A1 * | 11/2011 | Aikas et al. | 707/827 |
| 2013/0086264 A1 * | 4/2013 | Kini et al. | 709/225 |

OTHER PUBLICATIONS

"Namespace", Computer Desktop Encyclopedia, The Computer Language Company, retrieved on Dec. 8, 2014 from: http://lookup.computerlanguage.com/host_app/search?cid=C999999&term=namespace&lookup.x=0&lookup.y=0.*

Kulkarni, Dinesh C., et al., "Information Access in Mobile Computing Environments," Distributed Computing Research Lab, University of Notre Dame, Technical Report 93-11, Oct. 1993, 17 pages.

Welch, Brent, "A Comparison of Three Distributed File System Architectures: Vnode, Sprite, and Plan 9", Journal of Computing Systems, vol. 7, Issue 2, Spring 1994, 18 pages.

(Continued)

*Primary Examiner* — Alex Gofman
*Assistant Examiner* — Umar Mian
(74) *Attorney, Agent, or Firm* — Fish & Richardson P.C.

(57) ABSTRACT

A hosted storage system includes a namespace that contains object identifiers. A first object containing a first data component is stored. A first object identifier in the namespace uniquely identifies the first object. A second object containing a second data component is stored. A second object identifier in the namespace uniquely identifies the second object. A compose object request that designating the first object identifier, the second object identifier, and a third object identifier in the namespace is received. A third object that includes the first data component and the second data component without duplicating the first data component and the second data component is created. The third object identifier is associated with the third object such that the third object identifier uniquely identifies the third object.

27 Claims, 6 Drawing Sheets

(56) References Cited

OTHER PUBLICATIONS

Anderson et al., "The Core API," couchDB: The Definitive Guide (Chapter 4), Jan. 26, 2010, pp. 1-16, Retrieved from the Internet: URL:http://guide.couchdb.org/editions/1/en/api.html, [retrieved on May 23, 2014] pp. 7-12.

Anderson et al., "Security," couchDB: The Definitive Guide, Jan. 26, 2010, pp. 1-8, Retrieved from the Internet: URL: http://guide.couchdb.org/editions/1/en/security.html, [retrieved on May 23, 2014] p. 5.

Yu et al., "Securing Data Storage in Cloud Computing," Journal of Security Engineering, 9(3):251-260, Jun. 2, 2012, p. 256.

International Search Report and Written Opinion in International Application No. PCT/US2014/018487, mailed Jun. 6, 2014, 14 pages.

* cited by examiner

United States Patent

COMPOSING OBJECTS IN HOSTED STORAGE

TECHNICAL FIELD

This application relates to hosted storage.

BACKGROUND

Hosted, or cloud-based storage, refers to off-site or remote data storage that is typically provided by a third party. The third party may implement the hosted storage in a data center, and provide access to the hosted storage over a network, such as the Internet.

SUMMARY

In one aspect, a method for composing an object stored in a hosted storage system that includes a namespace that contains object identifiers for objects stored in the hosted storage system includes storing, at the hosted storage system, a first object, the first object includes a first data component. A first object identifier in the namespace uniquely identifies the first object in the hosted storage system and enables the first object to be retrieved by a client system over a network. The method further includes storing, at the hosted storage system, a second object, the second object includes a second data component. A second object identifier in the namespace uniquely identifies the second object in the hosted storage system and enables the second object to be retrieved by a client system over a network. The method further includes receiving, at the hosted storage system, a compose object request sent by a client system over a network to the hosted storage system, the compose object request designating the first object identifier, the second object identifier, and a third object identifier in the namespace. The method further includes in response to receiving the compose object request, creating, in the hosted storage system, a third object that includes the first data component and the second data component without duplicating the first data component and the second data component in the hosted storage system. The method further includes associating, in the hosted storage system, the third object identifier with the third object such that the third object identifier uniquely identifies the third object in the hosted storage system and enables the third object to be retrieved by a client system over a network.

Implementations can include any, all, or none of the following features. Creating the third object without duplicating the first data component and the second data component in the hosted storage system can include generating metadata that includes a first reference to the first data component and a second reference to the second data component. The compose request can designate an order for the first data object and the second data object in the third object; and the metadata designates an order for the first reference and the second reference that coincides with the order designated in the compose request.

The method can include receiving, at the hosted storage system, a read request sent by a client system over a network to the hosted storage system, the read request designating the third object identifier; retrieving the object from one or more storages in the hosted storage system using the third object identifier; and sending the retrieved object to the client system that sent the read request. The method can include maintaining storage of the first object and the second object after creating the third object.

The method can include storing a fourth data object that includes a fourth data component, wherein a fourth object identifier in the namespace uniquely identifies the fourth object in the hosted storage system and enables the fourth object to be retrieved by a client system over a network; and after creating the third object: receiving, at the hosted storage system, an additional compose object request sent by a client system over a network to the hosted storage system, the compose object request designating the first object identifier, the fourth object identifier, and a fifth object identifier in the namespace; in response to receiving the additional compose object request, creating, in the hosted storage system, a fifth object that includes the first data component and the fourth data component; and associating, in the hosted storage system, the fifth object identifier with the fifth object such that the fifth object identifier uniquely identifies the fifth object in the hosted storage system and enables the fifth object to be retrieved by a client system over a network.

The method can include storing a fourth data object that includes a fourth data component, wherein a fourth object identifier in the namespace uniquely identifies the fourth object in the hosted storage system and enables the fourth object to be retrieved by a client system over a network; and after creating the third object: receiving, at the hosted storage system, an additional compose object request sent by a client system over a network to the hosted storage system, the compose object request designating the third object identifier, the fourth object identifier, and a fifth object identifier in the namespace; in response to receiving the additional compose object request, creating, in the hosted storage system, a fifth object that includes the first data component, the second data component, and the fourth data component; and associating, in the hosted storage system, the fifth object identifier with the fifth object such that the fifth object identifier uniquely identifies the fifth object in the hosted storage system and enables the fifth object to be retrieved by a client system over a network. The first object can be associated with a first checksum generated using a composable function and the second object can be associated with a second checksum generated using the composable function, the method can include generating a third checksum for the third object based on the first checksum and the second checksum; and associating the third checksum with the third object. The third object identifier can be the same as a fourth object identifier for a fourth object, the fourth object being stored in the hosted storage system before the third object can be created, the method including overwriting the fourth object with the third object. The third object identifier can be the same as the first object identifier, the method further including overwriting the first object with the third object.

The first object identifier can include a bucket name and an object name. The first object can include a first metadata component and the second object can include a second metadata component. The first metadata component can include an access control list for the first object and the second metadata component can include an access control list for the second object. The compose object request can designate an access control list for the third object, the method can include creating the access control list for the third object and associating the access control list with the third object.

In one aspect, a computer storage medium stores a computer program. The program includes instructions that, when executed by one or more processing devices, cause the one or more processing devices to perform a process for composing an object stored in a hosted storage system that includes a namespace that contains object identifiers for objects stored in the hosted storage system. The process includes storing, at the hosted storage system, a first object, the first object includes a first data component. A first object identifier in the namespace uniquely identifies the first object in the hosted storage system and enables the first object to be retrieved by a client system over a network. The process further includes storing, at the hosted storage system, a second object, the second object includes a second data component. A second object identifier in the namespace uniquely identifies the second object in the hosted storage system and enables the second object to be retrieved by a client system over a network. The process further includes receiving, at the hosted storage system, a compose object request sent by a client system over a network to the hosted storage system, the compose object request designating the first object identifier, the second object identifier, and a third object identifier in the namespace. The process further includes in response to receiving the compose object request, creating, in the hosted storage system, a third object that includes the first data component and the second data component without duplicating the first data component and the second data component in the hosted storage system. The process further includes associating, in the hosted storage system, the third object identifier with the third object such that the third object identifier uniquely identifies the third object in the hosted storage system and enables the third object to be retrieved by a client system over a network.

Implementations can include any, all, or none of the following features. Creating the third object without duplicating the first data component and the second data component in the hosted storage system can include generating metadata that includes a first reference to the first data component and a second reference to the second data component. The compose request can designate an order for the first data object and the second data object in the third object; and the metadata designates an order for the first reference and the second reference that coincides with the order designated in the compose request.

The process can include receiving, at the hosted storage system, a read request sent by a client system over a network to the hosted storage system, the read request designating the third object identifier; retrieving the object from one or more storages in the hosted storage system using the third object identifier; and sending the retrieved object to the client system that sent the read request. The process can include maintaining storage of the first object and the second object after creating the third object.

The process can include storing a fourth data object that includes a fourth data component, wherein a fourth object identifier in the namespace uniquely identifies the fourth object in the hosted storage system and enables the fourth object to be retrieved by a client system over a network; and after creating the third object: receiving, at the hosted storage system, an additional compose object request sent by a client system over a network to the hosted storage system, the compose object request designating the first object identifier, the fourth object identifier, and a fifth object identifier in the namespace; in response to receiving the additional compose object request, creating, in the hosted storage system, a fifth object that includes the first data component and the fourth data component; and associating, in the hosted storage system, the fifth object identifier with the fifth object such that the fifth object identifier uniquely identifies the fifth object in the hosted storage system and enables the fifth object to be retrieved by a client system over a network.

The process can include storing a forth data object that include a fourth data component, wherein a fourth object identifier in the namespace uniquely identifies the fourth object in the hosted storage system and enables the fourth object to be retrieved by a client system over a network; and after creating the third object: receiving, at the hosted storage system, an additional compose object request sent by a client system over a network to the hosted storage system, the compose object request designating the third object identifier, the fourth object identifier, and a fifth object identifier in the namespace; in response to receiving the additional compose object request, creating, in the hosted storage system, a fifth object that includes the first data component, the second data component, and the fourth data component; and associating, in the hosted storage system, the fifth object identifier with the fifth object such that the fifth object identifier uniquely identifies the fifth object in the hosted storage system and enables the fifth object to be retrieved by a client system over a network. The first object can be associated with a first checksum generated using a composable function and the second object can be associated with a second checksum generated using the composable function, the process can include generating a third checksum for the third object based on the first checksum and the second checksum; and associating the third checksum with the third object. The third object identifier can be the same as a fourth object identifier for a fourth object, the fourth object being stored in the hosted storage system before the third object can be created, the process including overwriting the fourth object with the third object. The third object identifier can be the same as the first object identifier, the process further including overwriting the first object with the third object.

The first object identifier can include a bucket name and an object name. The first object can include a first metadata component and the second object can include a second metadata component. The first metadata component can include an access control list for the first object and the second metadata component can include an access control list for the second object. The compose object request can designate an access control list for the third object, the process can include creating the access control list for the third object and associating the access control list with the third object.

In one aspect, a computer system includes a hosted storage system configured to store a first object, the first object includes a first data component. A first object identifier in the namespace uniquely identifies the first object in the hosted storage system and enables the first object to be retrieved by a client system over a network. The hosted storage system is further configured to store a second object, the second object includes a second data component. A second object identifier in the namespace uniquely identifies the second object in the hosted storage system and enables the second object to be retrieved by a client system over a network receive a compose object request sent by a client system over a network to the hosted storage system, the compose object request designating the first object identifier, the second object identifier, and a third object identifier in the namespace. The hosted storage system is further configured to create, in response to receiving the composite object request, a third object that includes the first data component and the second data component without duplicating the first data component and the second data component in the hosted storage system. The hosted storage system is further configured to associate the third object identifier with the third object such that the third object identifier uniquely identifies the third object in the hosted storage system and enables the third object to be retrieved by a client system over a network. The system further includes the client system configured to send, to the hosted storage system, the compose object request.

Implementations can include any, all, or none of the following features. To create the third object without duplicating the first data component and the second data component in the hosted storage system, the hosted storage system can be configured to generate metadata that includes a first reference to the first data component and a second reference to the second data component. The compose request can designate an order for the first data object and the second data object in the third object; and the metadata can designate an order for the first reference and the second reference that coincides with the order designated in the compose request. The hosted storage system can be further configured to maintain storage of the first object and the second object after creating the third object.

The hosted storage system can be further configured to store a fourth object, the fourth object including a fourth data component, wherein a fourth object identifier in the namespace uniquely identifies the fourth object in the hosted storage system and enables the fourth object to be retrieved by a client system over a network; and after creating the third object: receive an additional compose object request sent by a client system over a network to the hosted storage system, the compose object request designating the first object identifier, the fourth object identifier, and a fifth object identifier in the namespace; create, in response to receiving the additional compose object request, a fifth object that includes the first data component and the fourth data component; and associate the fifth object identifier with the fifth object such that the fifth object identifier uniquely identifies the fifth object in the hosted storage system and enables the fifth object to be retrieved by a client system over a network.

The hosted storage system can be further configured to store a fourth object, the fourth object including a fourth data component, wherein a fourth object identifier in the namespace uniquely identifies the fourth object in the hosted storage system and enables the fourth object to be retrieved by a client system over a network; and after creating the third object receive an additional compose object request sent by a client system over a network to the hosted storage system, the compose object request designating the third object identifier, the fourth object identifier, and a fifth object identifier in the namespace; create, in response to receiving the additional compose object request, a fifth object that includes the first data component, the second data component, and the fourth data component; and associate the fifth object identifier with the fifth object such that the fifth object identifier uniquely identifies the fifth object in the hosted storage system and enables the fifth object to be retrieved by a client system over a network. The first object can be associated with a first checksum generated using a composable function and the second object is associated with a second checksum generated using the composable function, the hosted storage system can be configured to generate a third checksum for the third object based on the first checksum and the second checksum; and associate the third checksum with the third object. The third object identifier can be the same as a fourth object identifier for a fourth object, the fourth object being stored in the hosted storage system before the third object is created, the hosted storage system can be configured to overwrite the fourth object with the third object. The third object identifier can be the same as the first object identifier, the hosted storage system can be further configured to overwrite the first object with the third object.

The first object identifier can include a bucket name and an object name. The first object can include a first metadata component and the second object can include a second metadata component. The first metadata component can include an access control list for the first object and the second metadata component can include an access control list for the second object. The compose object request can designate an access control list for the third object, the hosted storage system can be configured to create the access control list for the third object and associating the access control list with the third object.

The details of one or more implementations are set forth in the accompanying drawings and the description below. Other features and advantages will be apparent from the description and drawings, and from the claims.

DETAILED DESCRIPTION

A hosted storage system may support composing a new object from multiple component objects stored in the hosted storage system. For instance, a client system may store N component objects in the hosted storage system, and then send a request to compose the N component objects into a single composite object. In response to the request, the hosted storage system creates the new composite object that contains the data in the component objects.

Figure 1:
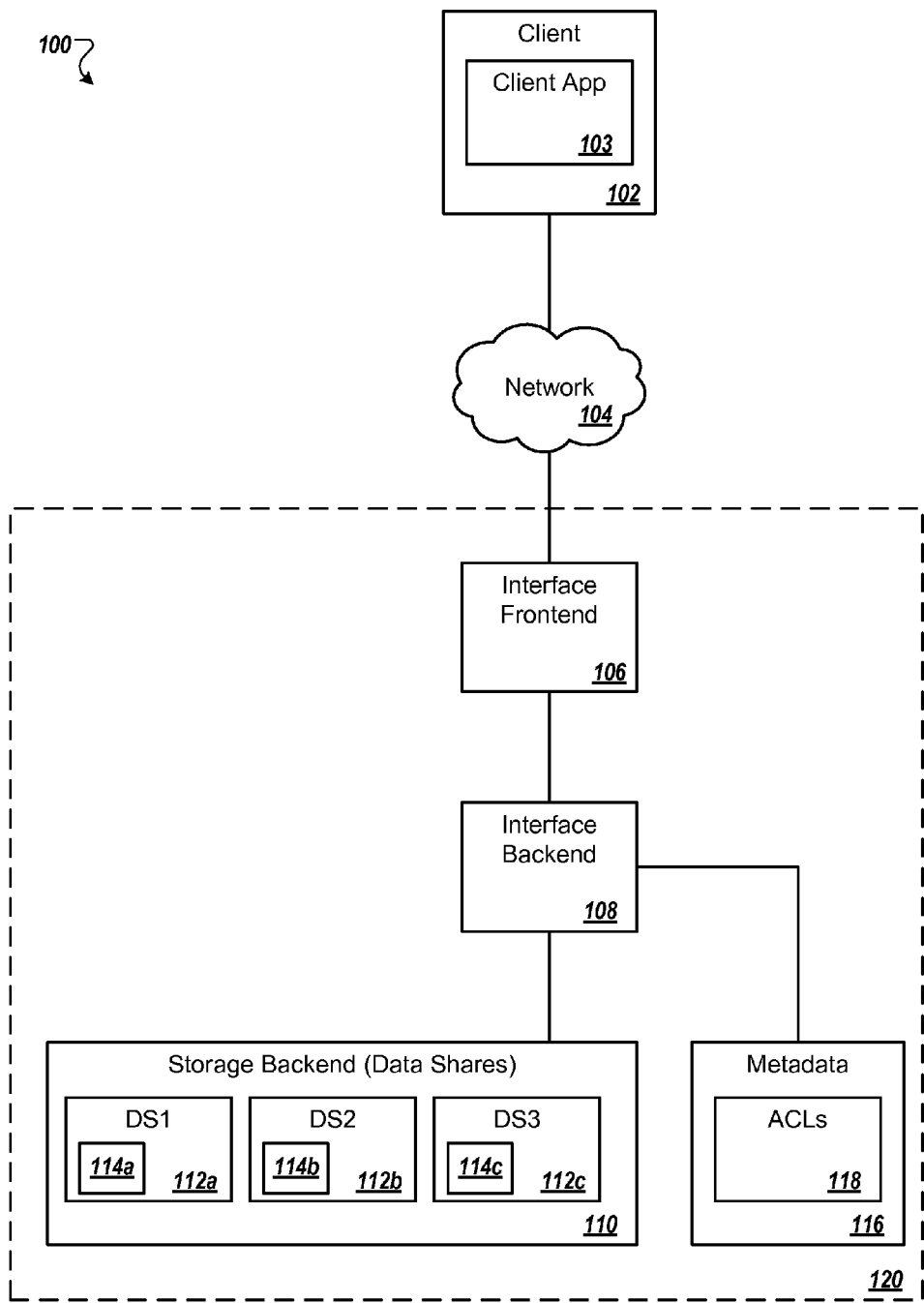
FIG. 1 is a block diagram showing an example of a system for providing hosted storage and accessing the hosted storage from a client system.

FIG. 1 is a block diagram showing an example of a system 100 for providing hosted storage and accessing the hosted storage from a client system 102. In some implementations, a hosted storage system 120 can provide access to stored data by applications running on computing devices geographically separate from each other, provide offsite data backup and restore functionality, provide data storage to a computing device with limited storage capabilities, and/or provide storage functionality not implemented on a computing device.

The system 100 can provide scalable stores for storing data objects. The client system 102 can store data objects to the hosted storage system 120 and control access to the stored data objects. Access control can include a range of security levels, from keeping data securely confidential to publishing it without restrictions. Data stored in hosted storage system 120 can be secured from unauthorized access. The hosted storage system 120 can use a simple and consistent application programming interface, or API, which can allow arbitrary quantities of structured or unstructured data to be kept private or shared between individuals, organizations, or with the world at large. The client system 102 can store data in the hosted storage system 120 for personal reasons (e.g. to store personal data in a secure online location, to provide access to data from multiple devices, and to retain access to data while away from a primary device or system), mutual business reasons (e.g., submission of work product by one customer of the hosted storage system for use by another customer of the hosted storage system 120), or for use in data processing by other services (e.g., images uploaded are used to automatically and dynamically create a photo gallery web page.)

Figure 6:
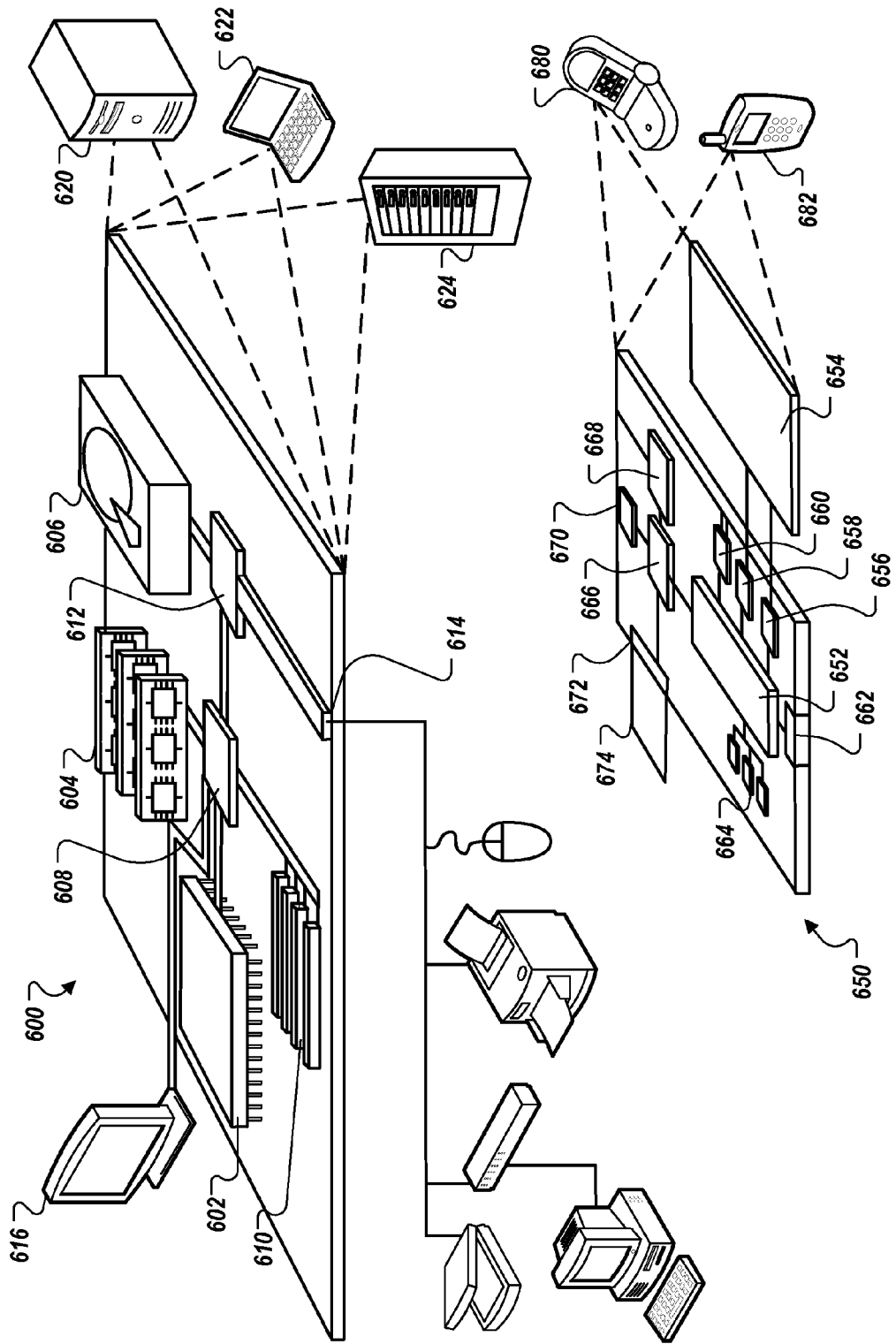
FIG. 6 shows an example of a computing device and a mobile computing device.

The client system 102 can be implemented using a computing device, such as the computing device 600 or the mobile device 650 described with respect to FIG. 6. The client system 102 can communicate with the hosted storage system 120 via a network 104, such as the Internet. The client system 102 can communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client system 102 is shown, there can be multiple client systems communicating across the network 104 with the hosted storage system 120 and/or other services and devices.

The hosted storage system 120 can be implemented such that client applications (for example, client application 103) can store, retrieve, or otherwise manipulate data objects in the hosted storage system 120. The data objects can include a data component, such as a file, and a metadata component. The metadata component can include data that describes various object qualities. In some implementations, the hosted storage system 120 may be designed such that data objects are immutable. That is, the hosted storage system 120 may be designed such that the data component of a data object can not be directly modified by a client system 102 after the data object is stored in the hosted storage system. Rather, the hosted storage system 120 may be designed to only allow a client system 102 to store or delete a given data object, but not modify the data component of the given data object. In such a case, the hosted storage system 120 may be designed to allow a client system 102 to modify none, some, or all of the metadata component. In some implementations, data objects may be treated by hosted storage system as unstructured, uninterpreted data.

The hosted storage system 120 can be implemented by one or more server devices, which can be implemented using computing devices, such as multiple computing devices 600 that are part of a rack server system 624 as described with respect to FIG. 6. For example, the hosted storage system 120 can be implemented by multiple server devices operating in the same, or different, data centers.

The hosted storage system 120 generally includes an interface frontend 106, an interface backend 108, a storage backend 110, and metadata 116 for objects stored in the storage backend 110. In general, the interface frontend 106 may receive requests from and send responses to the client system 102. For instance, the hosted storage system 120 can be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface.

An interface frontend 106 can receive messages from the client 102 and parse the request into a format usable by the hosted storage system 120, such as a remote procedure call (RPC) to an interface backend 108. The interface frontend 106 writes responses generated by the hosted storage system 120 for transmission to the client 102. In some implementations, multiple interface frontends 106 are implemented, for example, to support multiple access protocols or to provide load balancing.

The interface frontend 106 can include a graphical front end, for example to display on a web browser for data access. The interface frontend 106 can include a sub-system to enable managed uploads and downloads of large files (e.g., for functionality such as pause, resume, and recover from time-out). The interface frontend 106 can monitor load information and update logs, for example to track and protect against denial of service (DOS) attacks.

As described above, the Web Service API may be a REST-based HTTP interface. In a REST-based interface, a data object is accessed as a resource, uniquely named using a URI, and the client application 103 and service 120 exchange representations of resource state using a defined set of operations. For example, requested actions can be represented as verbs, such as by HTTP GET, PUT, POST, HEAD, and DELETE verbs. The GET verb may be used to retrieve an object, while the HEAD verb may be used to retrieve information about an object (for example, metadata) without retrieving the object itself. The DELETE verb may be used to delete an object from the hosted storage system 120. The PUT and POST verbs may be used to store an object in the service 120 or to compose a new object from multiple objects stored in the service 120, as described further below. PUT requests can come from the client 102 and contain authentication and authorization credentials and object metadata in the message, such as in an HTTP header. POST requests can be received when a client 102 wants to upload from a web browser form. The form POST upload protocol for the hosted storage system 120 can involve multiple required form fields to provide authentication, authorization and object metadata. More generally, any of the API requests may include processing instructions (including pre- or post-processing instructions, metadata, and/or credentials for authentication and authorization, for example, in a header of the request. For example, an authorization header may be included in the REST requests, which includes an access key to identify the entity sending the request.

Alternatively, or additionally, a user can be authenticated based on credentials stored in a browser cookie, which gets appended to the API requests. If no valid cookie is present, a redirect to an authentication frontend can be generated, and the authentication frontend can be used to generate the browser cookie. The authentication frontend can be used by systems and services in addition to the hosted storage system 120 (e.g., if the organization operating the hosted storage system 120 also operates other web services such as email service.) A user can also or alternatively be authenticated based on authentication credentials from an external credentialing service or an external service that includes credentialing functionally. User or group identifier information can be calculated from the external service's credential information. Requests sent by the client 102 to the interface frontend 106 can be translated and forwarded to the external service for authentication.

In general, objects stored in the hosted storage system 120 can be referenced by object identifiers. The hosted storage system 120 can include a namespace that contains the object identifiers and can define name scheme to which a valid object identifier must conform. For example, the name scheme may require that object identifiers be a sequence of Unicode characters whose UTF-8 encoding is at most 1024 bytes long. As another example, the name scheme may require that object identifiers be globally unique identifiers (GUIDs), which may be 128-bit integers.

Objects can be stored in hosted storage system 120, and may be logically divided into containers or "buckets" to make organization and management easier. In some examples, each bucket is uniquely named in the hosted storage system 120, each object is uniquely named in a bucket, and every bucket and object combination is a unique object identifier in the overall namespace of the hosted storage system. Objects may be uniquely identified by a URI that includes the bucket name and the object name, and identifies the hosted storage system 120. For example, an object named "long/song.mp3" in a bucket named "music" could be specified using a URI pattern such as http://s.hostedstoragesystem.com/music/long/song.mp3 or http://music.s.hostedstoragesystem.com/long/song.mp3. Alternatively, the user of the client 102 can create a bucket named www.music.org, publish a CNAME that causes requests to www.music.org to be directed to music.s.hostedstoragesystem.com, and address the object as http://www.music.org/long/song.mp3. In some examples, buckets do not nest.

The interface backend 108 can handle request authentication and authorization, can manage data and metadata, and can track activity such as for billing. The interface backend 108 can provide functionality for independent frontend/backend scaling for resource utilization and responsiveness under localized heavy loads. Data management can be encapsulated in the interface backend 108 while communication serving can be encapsulated in the interface frontend 106. The interface backend 108 can isolate security mechanisms from the client-facing interface frontend 106.

The interface backend 108 can expose an interface usable by both the interface frontend 106 and other systems. In some examples, some features of the interface backend 108 are accessible only by an interface frontend (not shown) used by the owners of the hosted storage system 120 (internal users). Such features can include those needed for administrative tasks (e.g., resolving an object reference to a low level disk address.) The interface backend 108 can handle request authentication (e.g., ensuring a user's credentials are valid) and authorization (e.g., verifying that a requested operation is permitted.) The interface backend can also provide encryption and decryption services to prevent unauthorized access to data, even by internal users.

The interface backend 108 can manage the metadata components 116 of the data objects, for example in a structured data format such as a database (e.g., MySQL). User-specified names labeling the buckets can be completely defined within the metadata 116, and object metadata 116 can map a resource name to one or more data shares 112 storing the resource. The metadata 116 can also contain bucket and object creation times, object sizes, hashes, and access control lists 118 (ACL 118) for both buckets and objects. The interface backend 108 can log activity and track storage consumption to support accounting for billing and chargebacks. In some examples, this includes quota monitoring in each dimension in which customers are charged (e.g., reads, writes, network transfers, total storage in use.)

The ACLs 118 define the entities that are authorized to perform actions on corresponding buckets or objects, and the nature of the permitted actions. The ACLs 118 can be an unordered list of {scope, role} pairs, plus Boolean flags. The scope may define a user or group of users, and the role may define the access permissions for the user or group. In some examples, the union of all {scope, role} pairs can define access rights. In some examples, more specific {scope, role} pairs override more general ones. Table 1: Bucket Roles below shows a list of example roles that can be included in ACLs 118 for buckets. Table 2: Object Roles below shows a list of example roles that can be included in ACLs 118 for data objects. While Table 2 does not include a WRITE role for objects, some implementations may include a WRITE role that allows objects to be changed.

TABLE 1

Bucket Roles

| Role | Capabilities |
|---|---|
| READ | Can list the bucket's contents. Cannot create or delete objects. |
| WRITE | READ capabilities plus ability to create and delete objects in the bucket. |
| FULL_CONTROL | WRITE capabilities plus ability to read and write the bucket ACL. |

TABLE 2

Object Roles

| Role | Capabilities |
|---|---|
| READ | Can read the object. |
| FULL_CONTROL | READ capabilities plus ability to read and write the object ACL. |

Scopes can be defined to a single user or a group of users. In one implementation, those users with a FULL_CONTROL role (and therefore able to modify the ACL for a given bucket or resource) may define a group of users, and then provide a role for the group. For example, a group of users may be managed by the hosted storage system 120 (or, more generally, by the service provider that provides the hosted storage system 120) for reasons other than storage permissions (for example, for a message board or other service that employs groups) and those groups may be identified by a single username or other identifier associated with the group of users, an e-mail address associated with the group of users (which may or may not also correspond to an identifier of the group), or a domain name associated with a group. This may allow a user to specify a preexisting group managed by the service provider that is already defined by the identifier, e-mail address, or domain name. Similarly, users may be able to specify a group of users (for example, by user id or e-mail address) and associate an access key with the group. This may allow for the formation of ad-hoc groups for the management of storage permissions, rather than groups already managed by the service provider.

In this way, a group of users can be given a particular role simply by managing the role of the group. Similarly, if the ACL is associated with a bucket containing a number of objects, or the ACL is otherwise associated with multiple objects, the role with respect to those objects can be easily changed by simply changing the role of the group. As another example, the grouping mechanism may facilitate the easy change of permissions for objects shared with a with a team of people. To share the object with the team members, a group including the team members can be added to the ACL for an object. Then, to change who has access to the object, the members can be added to or removed from the group, rather than updating the ACL.

Table 3: Scopes below shows a list of example scopes that can be included in ACLs 118 for buckets and/or data objects.

TABLE 3

Scopes

| Name | Description |
|---|---|
| Service ID | A single authenticated user specified by username. |
| Email Address | A single user specified by an email address. |

TABLE 3-continued

Scopes

| Name | Description |
| --- | --- |
| Service Group ID | A group of users managed by the hosted storage system 120 and specified by an associated identifier. |
| Invite Token | One or more users with access to a one time use digital token. |
| Group-Restricted Key | One or more users with access to a permanent use digital key. |
| All Service Users | All authenticated users of the hosted storage system 120. |
| All Users | All users, no authentication. Can be anonymous or semi-anonymous. |

The FULL_CONTROL role can represent all possible capabilities, such as those assigned to an object or bucket owner connected to a financially responsible party. The bucket owner can be configured to always have FULL_CONTROL for the bucket. In general, the bucket and/or object owner can create or modify scopes and roles in the corresponding ACLs, but in some implementations the pair {bucket owner, FULL_CONTROL} may be prevented from being removed from the bucket ACL 118 (or the object ACL). To create an object, a user can have write permission on the bucket, which can be granted by WRITE and FULL_CONTROL. WRITE permission on the bucket can imply permission to delete or overwrite an object in the bucket. Additional constraints can disallow certain modifications to ACLs 118. In some examples, it is possible to create an object that the bucket owner cannot read.

The storage backend 110 can contain multiple datastores 112a-112c for storing the data components of objects. Although three datastores 112 are shown, more or fewer are possible. Each of the datastores 112a-112c can store the data components of data objects 114a-114c in a particular format. For example, data store 112a can store a data component 114a as a Binary Large Object (BLOB), data store 112b can store a data component 114b in a distributed file system (e.g., Network File System), and data store 112c can store a data component 114c in a structured data format such as a database (e.g., MySQL).

The hosted storage system 120 may support composing an object from multiple objects stored in the hosted storage system 120. For instance, the API of the hosted storage system 120 may allow a client system 102 to compose a new object from multiple objects stored in the hosted storage system 120. The API may implement a compose request that can be sent from a client system 102. The compose request can designate multiple component objects and specify that those objects be combined into a composite object. In response to receiving the compose request, the hosted storage system 120 may create copies of the objects and use the copies to create a new object that includes the data components of the component objects specified in the compose request. In some implementations, rather than creating copies by actually duplicating data bytes in the storage system, the hosted storage system 120 may create copies using a snapshotting operation in which a new reference to the data components is generated and used to access an object's data. In this case, each "copy" of a data object may be a reference to a single copy of the data object's data component in the storage system, rather than having the data component duplicated in the storage system.

The hosted storage system 120 may treat component and composite objects in the same manner (that is, neither are special types of objects in the hosted storage system 120) and, accordingly, may not distinguish between the two. Thus, once created, the composite object may be treated the same as any other objects stored in the hosted storage system 120 and can themselves be used as component objects.

In some implementations, the hosted storage system 120 may provide no guarantees about the composite object if the component objects were being changed at the time of the compose operation. For example, a user creates two objects that are readable by a second user, and that second user then runs a compose operation over those two objects. While that compose operation is running, the first user removes the second user from the read grant on one of the objects, or overwrites one of the objects. Rather than trying to insure those operations are reflected in the composite object, the hosted storage system 120 may be designed to perform the ACL checks in sequence (thereby resulting in the compose operation proceeding because the second user had read permission at the time of the check), and then build the composite object based on the values of the component objects at the time each is being cloned, with no guarantee about the state of the composite object if the components were being changed at the time of the compose operation. However, other implementations may employ mechanisms to impose a global guarantee on the state of the composite object.

The compose request may be implemented as an HTTP PUT or POST request with a header that designates the request is a compose request, rather than a storage request (in those cases where HTTP PUT or POST requests are also used to implement object storage). The compose request may implicitly or explicitly designate an order for the multiple component objects and the new object may include the corresponding data components in that order. For instance, the compose request may designate component objects A, B, and C in that order. When the hosted storage system 120 receives the compose object request, the hosted storage system 120 creates the new object with the data component for object A at the beginning of the new object, the data component for object B in the middle of the new object, and the data component of object C at the end of the new object. The compose object request may also designate a bucket and object name for the new object and the hosted storage system 120 may create the new object in the designated bucket with the designated name.

In some implementations, metadata for a new object created as a result of a compose object request may not be inherited from the metadata components of the component objects. In this case, the API may be designed so that client controllable metadata for the new object is designated in the compose object request. For instance, the compose object request may designate access controls for the new object. In alternative implementations, the hosted storage system 120 may support inheritance of metadata from the metadata of component objects.

The hosted storage system 120 may store checksums associated with the objects stored in the hosted storage system 120. In such a scenario, the hosted storage system 120 may use a composable checksum function. This may allow a checksum to be generated for a new composite object to be generated easily and quickly from the checksums associated with the component objects. A composable checksum function such as crc32c may be used.

In some implementations, once a composite object is created from component objects, the hosted storage system 120 does not delete the component objects and instead maintains storage of the component objects as they were before the composite object was created. In this case, the hosted storage system 120 may rely on the client system 120 to delete component objects once a composite object is created, if that is appropriate for the purposes the client system 102 is storing the objects. Such a design may allow a given data object to be used in multiple compose requests. For instance, a client system 102 may send a compose object request to combine objects A and B, and then send another compose object request to combine objects A and C. Because A and B are not automatically deleted by the hosted storage system 120 once the composite object is created from A and B, the second compose object request can be performed to create a composite object from component objects A and C. Other designs may have the hosted storage system 120 delete the component objects automatically upon creation of a composite object.

By providing for the composition of new objects from stored objects, the hosted storage system 120 can afford client systems some limited modification functionality even in implementations where objects are immutable. For instance, client systems 102 may be able to have the hosted storage system 120 append additional data to a stored object by composing a new object from the stored object and a second object that includes the additional data. Similarly, a client system 102 may be able to edit an object by composing an object A from objects B and C, replace B with B', and then recompose A from B' and C. Without the ability to compose objects, the client would have to edit the entire object itself, and then replace the version of the object in the hosted storage system 120 with the edited object.

The hosted storage system 120 may allow a composite object to overwrite an existing object, including one of the component objects used to create the composite object. For example, the append functionality could be provided with this mechanism in two ways. For instance, objects A and B can be composed to form X. Then later, A, B, and C can be used to form X' (where X' has the same name as X, but the prime indicates the "new" X that contains the updated content including C). Since the new X' has the same name as X, the new X' overwrites the old X, which results in C effectively being appended to X. Even more simply, A and B can be composed into A' that has the same name as A and overwrites A. This effectively appends B to A. Then later, for example, A' and C can be composed into A", which has the same name as A' and overwrites A' to effectively append C to A'. Similarly, this could be used to take daily logs and append them to a "year to date" object that always has the same name.

The ability to compose new objects from stored objects may also provide a mechanism for the parallel upload of an object. For instance, a client system 102 may upload the data components of N independent objects to the hosted storage system 120. The client system 102 may intend the N independent objects to be a part of a larger object. After uploading the N independent objects, the client system 102 may initiate a compose operation on the N objects to form the larger object. Uploading the data components of each part in parallel may be faster than uploading a single large object whose content is equivalent to the concatenation of the component objects.

Figure 2:
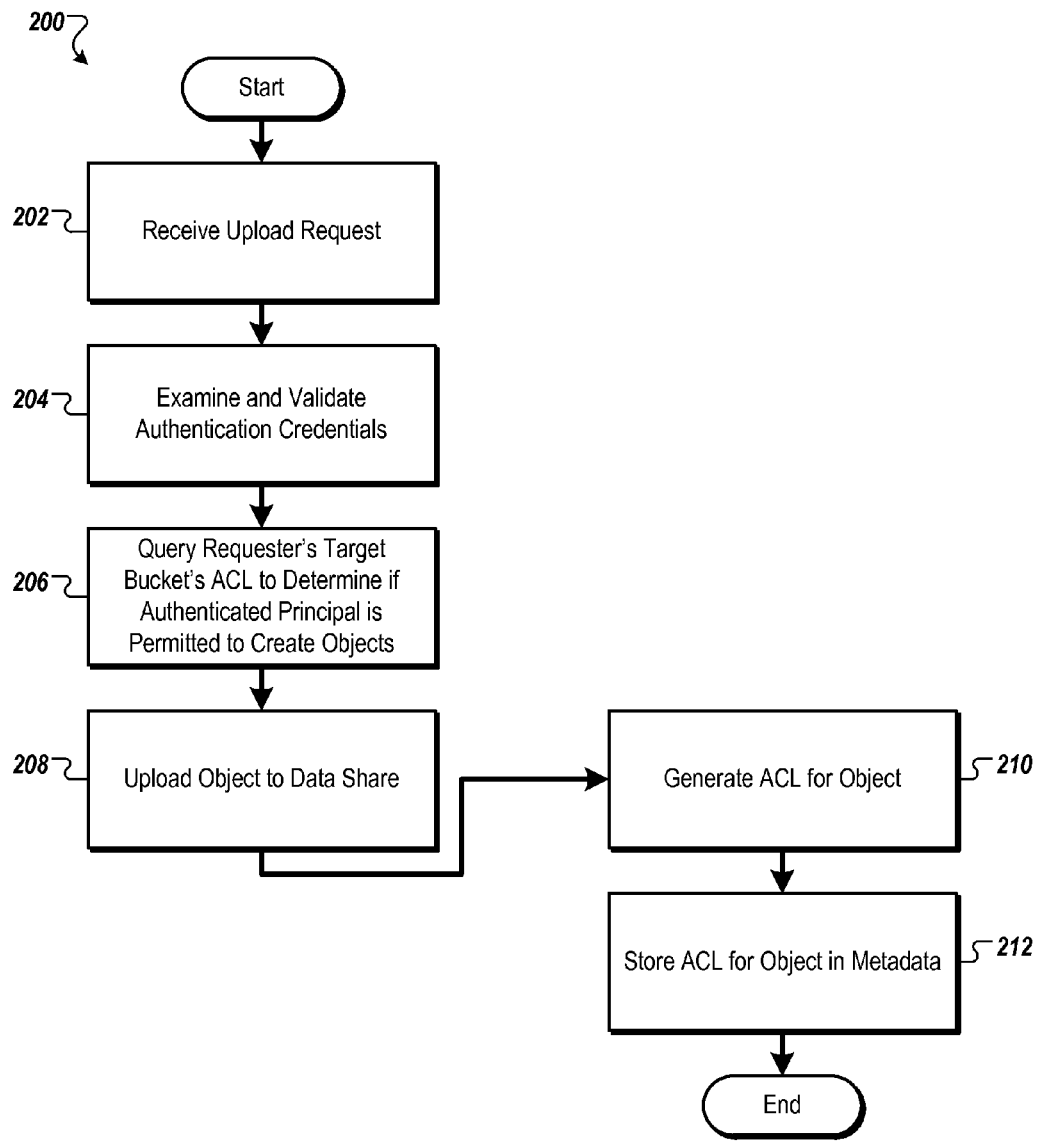
FIG. 2 is a flow chart showing an example of a process for storing a data object in a hosted storage system.

FIG. 2 is a flow chart showing an example of a process 200 for storing a data object in a hosted storage system. The process 200 can be performed by, for example, the interface frontend 106 and the interface backend 110, and for clarity of presentation, the description that follows uses the system 100 as the basis for describing the process. However, another system, or combination of systems, may be used to perform the process 200.

A request is received by the interface frontend 106 from the client application 103 to store an object (202). The request can include a HTTP PUT or POST request, an authentication credential that authenticates the principal (entity) making the request, metadata for the object, the data component of the object, and a target for the object consisting of a bucket and data object name. In some examples, the authentication credentials can include an interoperable authentication header, token, or cookie. The interface frontend can make a RPC to the backend 108 including the request headers.

The interface backend 108 can examine and validate the authentication credentials (204). For example, native credentials (e.g., user ID, token) can be validated using internal validation features of the hosted storage system 120. External credentials (e.g., user names and passwords for another system) can be sent to the associated external system for validation.

The interface backend 108 can query the request's target bucket's ACL 118 to determine if the authenticated principal is permitted to create an object in the bucket (206). For example, the principal or a group the principal is a member of can have the WRITE or FULL_CONTROL role assigned in the bucket's ACL 118, which would allow the principal to create an object in the bucket. If the principal is not authorized to create an object, the request is denied.

Otherwise, the interface backend 108 creates the object in the target bucket with the target data object name by storing the data component in a datastore 112 and storing metadata associating the data component with the target bucket and target object name (208). In some examples, each bucket is associated with only a single datastore 112, and specifying a target bucket specifies a datastore 112. In some examples, the interface backend 108 can examine the data object or use a parameter in the RPC from the interface frontend 106 to determine which datastore 112 to store the object in, with associated metadata 116 indicating the location of the data component (that is, the particular datastore the data component is stored in and the data component's location in that datastore).

The interface backend 108 creates an ACL 118 representing the access control list for the newly created object (210). In some examples, a default ACL 118 is used or an ACL 118 can be specified by the request from the client 102. The interface backend 108 stores the object's ACL 118 in the object's metadata 116 (212).

Figure 3:
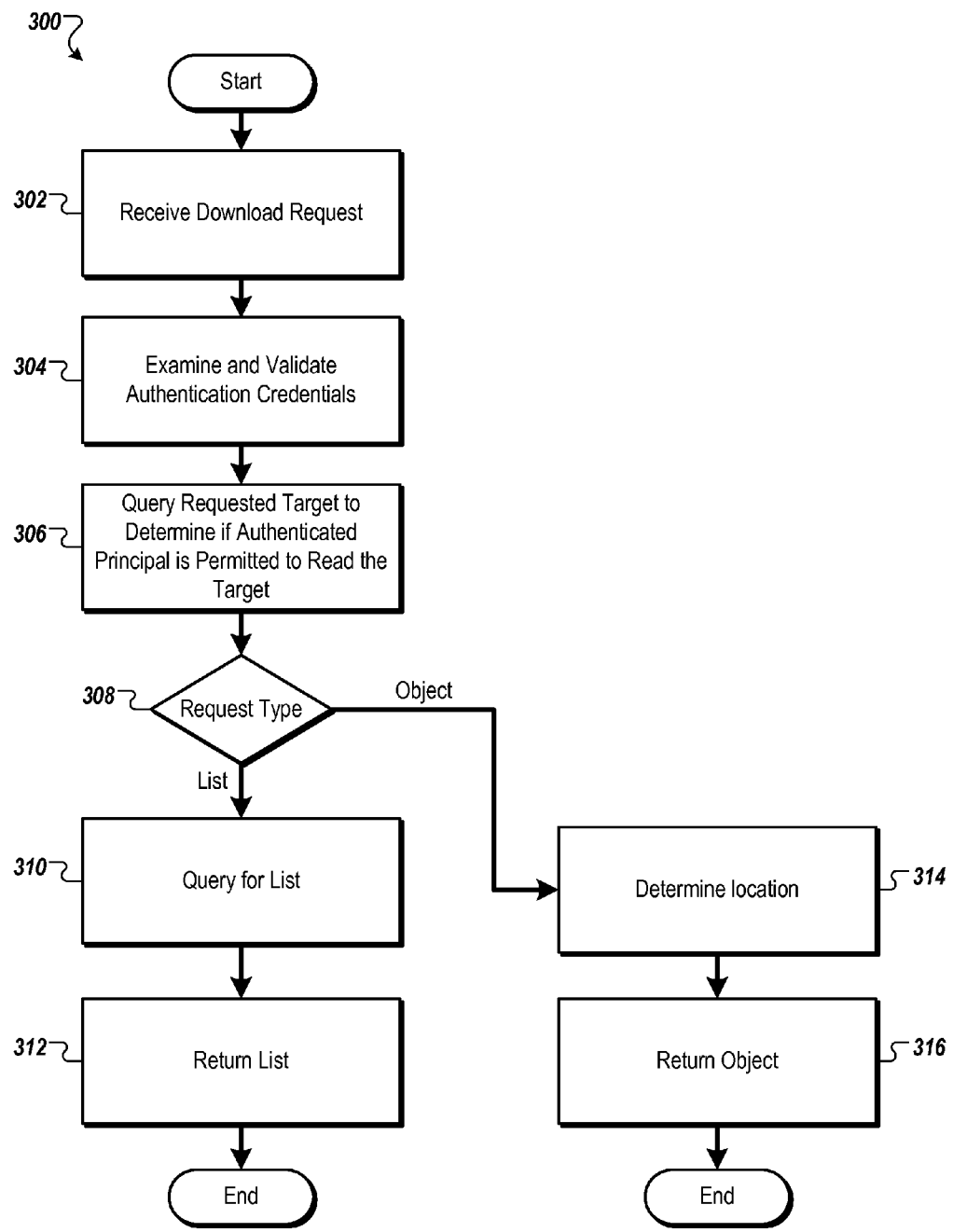
FIG. 3 is a flow chart showing an example of a process for reading a bucket or object.

FIG. 3 is a flow chart showing an example of a process 300 for reading a bucket or object. The process 300 can be performed by, for example, the interface frontend 106 and the interface backend 108, and for clarity of presentation, the description that follows uses the system 100 as the basis for describing the process. However, another system, or combination of systems, may be used to perform the process 300.

A read request is received by the interface frontend 106 from the client application 103 to download an object (302). The read request can include a HTTP GET request, an authentication credential that authenticates the principal (entity) making the request, and a target consisting of a bucket (and optionally data object) name. In some examples, the authentication credentials can include an interoperable authentication header, token, or cookie. The interface frontend can make a RPC to the backend 108 including the request headers.

The interface backend 108 examines and validates the authentication credentials included in the request (304). For example, native credentials (e.g., user ID, token) can be validated using internal validation features of the hosted storage system 120. External credentials (e.g., user names and passwords for another system) can be sent to the associated external system for validation.

The interface backend 108 queries the request's bucket or object ACL 118 to determine if the authenticated principal is permitted to read the target (306). For example, the principal or a group the principal is a member of can have the READ, WRITE or FULL_CONTROL role assigned, which would allow the principal to read or otherwise access the target. If the principal is not authorized to read or access the target, the request is denied.

Otherwise, the interface backend 108 determines if the request is for a bucket or for an object (308). If the request is for a bucket, the interface backend 108 queries for a list of the bucket's contents (310) and the listing is returned to the client application 103 (312).

Figure 4:
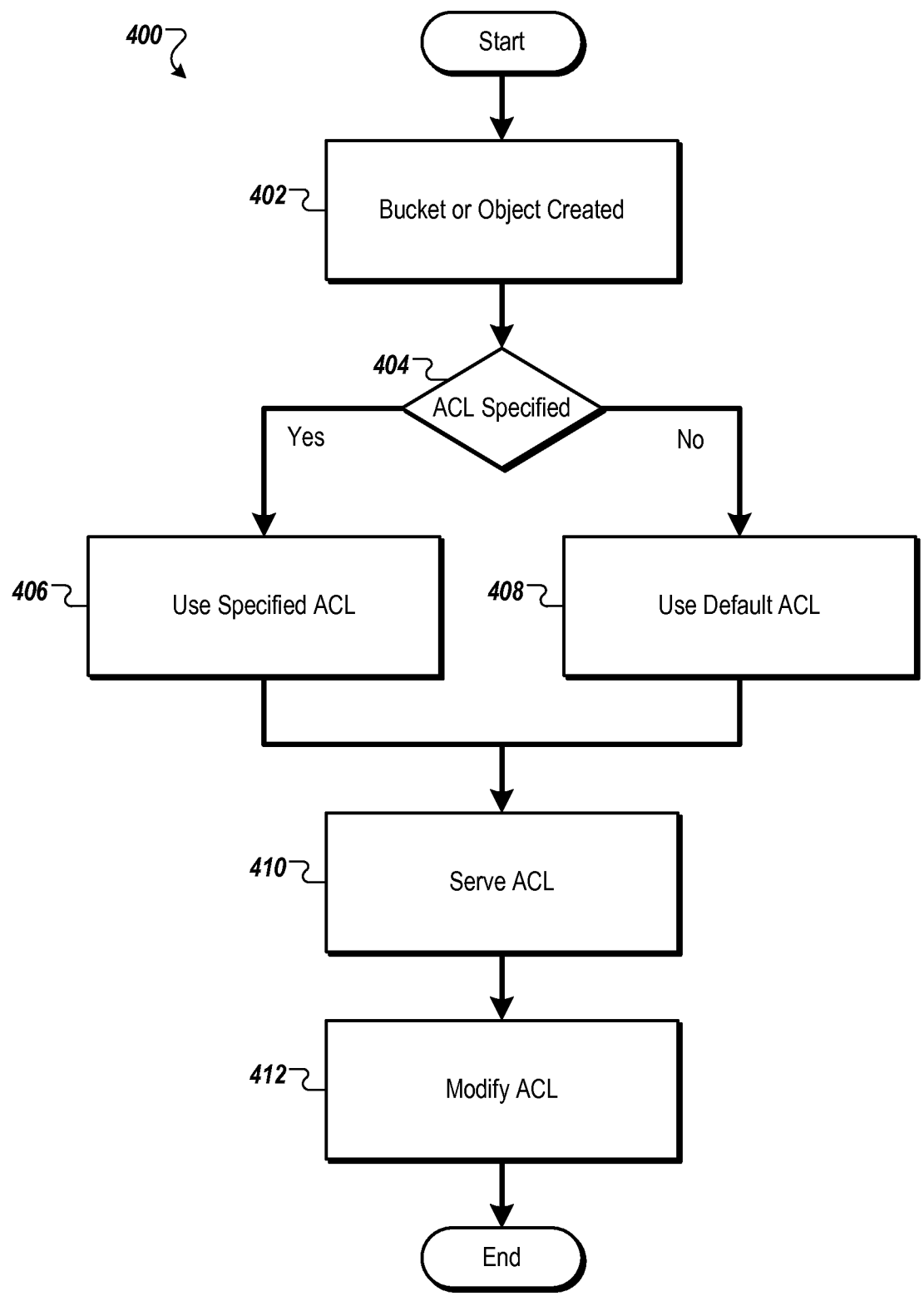
FIG. 4 is a flow chart showing an example lifecycle of an access control list.

If the request is for an object, the interface backend 108 determines the location of the object's data component, for instance, by examining the object's metadata 116, which may be indexed by the object's identifier (for example, the bucket name and object name) (314). The interface backend 108 then retrieves the data component and returns the data component with any appropriate metadata to the client application 103 (316). For instance, the data component and any appropriate metadata may be returned in a response to a HTTP GET request FIG. 4 is a flow chart showing an example lifecycle 400 of an ACL 118. Although the steps of the lifecycle 400 show an order of steps, it is not implied that each step leads directly to another. The steps shown are a listing of possible steps that may be performed on an ACL 118 in roughly chronological order. The actual order, number, and kind of steps will be dependent on implementation details and usage of the hosted storage system 120.

A bucket or object is created by the backend interface 108 based on requests from the client application 103 (402). The client request can include a bucket name, an object name, and/or an ACL 118. The principal requesting the new bucket or object is authenticated and made the owner of the bucket or object.

If an ACL 118 is specified in the request (404), the specified ACL 118 is associated with the bucket or object. If the specified ACL 118 does not include a {scope, role} pair specifying the principal having FULL_CONTROL, one such {scope, role} pair can be added to the ACL 118. In one implementation, an ACL may be specified in a request by enumerating each scope and role pair to be included in the ACL, or may be specified by reference to the name of a pre-specified or "canned" ACL. A list of pre-specified or 'canned' ACLs is shown in Table 4 Canned ACLs below. The canned ACLs 118 can be cataloged by the hosted storage system 120 and referenced by the client application 103 by name, rather than requiring the request enumerate each scope and role pair.

TABLE 4

Canned ACLs

| Canned ACL Name | {scope, permission} |
| --- | --- |
| private | {creating user or bucket owner, FULL_CONTROL} |
| public-read | {all users, READ} |
| | {bucket owner, FULL_CONTROL} |
| public-read-write | {all users, WRITE} |
| | {bucket owner, FULL_CONTROL} |
| authenticated-read | {all authenticated users, READ} |
| | {bucket owner, FULL_CONTROL} |
| bucket-owner-read [for objects only] | {bucket owner, READ} |
| | {object owner, FULL_CONTROL} |
| bucket-owner-full-control [for objects only] | {bucket owner, FULL_CONTROL} |
| | {object owner, FULL_CONTROL} |

If an ACL 118 is not specified in the request (404), a default ACL 118 can be used (408). For example, bucket and object creation can default to the "private" canned ACL 118 for authenticated users. For object creation by unauthenticated users, such as for new objects created in a "public-read-write" bucket, a default of "bucket-owner-full-control" can be used.

An ACL 118 can be served, for example, to a principal with READ, WRITE, or FULL_CONTROL of the associated bucket or object, although other implementations may limit this to just principals with FULL_CONTROL (410). For example, a client application 103 can perform a HTTP GET to a target's URI with the query string ?acl to retrieve the ACL associated with the target. The ACL 118 can be serialized and returned to the client application 103.

The serialization may be defined, for example, by the following extended Backus-Naur form. Nonterminals appear in sans serif italics, terminals appear in Courier Bold, { } denote zero or more repetitions, [ ] enclose optional entities, | separates alternatives, and ( ) denote grouping. The terminal symbols canonical-id, email-address, and domain are defined in English below:

```
access-control-list: <AccessControlList> owner
  entries</AccessControlList>
owner: <Owner> id </Owner>
entries: <Entries> entry {entry} </Entries>
entry: <Entry> (permission scope|scope permission)</Entry>
permission: <Permission> (READ |WRITE |FULL_CONTROL )
  </Permission>
scope: <Scope type=UserById> id</Scope>
  |<Scope type=UserByEmail> email</Scope>
  |<Scope type=GroupById> id</Scope>
  |<Scope type=GroupByEmail> email</Scope>
  |<Scope type=GroupByDomain> <Domain> domain</Domain> </Scope>
  |<Scope type=AllUsers/>
  |<Scope type=AllAuthenticatedUsers/>
id: <ID> canonical-id</ID> [<Name> text</Name> ]
  |[<Name> text</Name> ]<ID> canonical-id</ID>
email: <EmailAddress> email-address</EmailAddress>
  [<Name> text</Name>]
  |[<Name> text</Name> ]<EmailAddress> canonical-id</EmailAddress>
text: {printable character excluding < and >}
canonical-id: 64 hex digits
email-address: standard RFC 822 email address
domain: standard RFC 822 domain specification
```

A canonical-id or an email-address can identify a user or a group. A canonical-id is the encrypted service id for the user or group. Email addresses are a convenience for specifying canonical ids. In some implementations, the ACLs returned from the system always contain canonical ids. The <Name> teXt</Name> element may be used for information purposes only such that it is otherwise ignored by the system, and the system does not return it if there is no public name associated with the user or group.

An example serialized ACL 118 is shown below.

```
<AccessControlList>
<Owner>
<ID>a9a7b886d6fd24a52fe8ca5bef65f89a64e0193f23000e241bf-
9b1c61be666e9</ID>
<Name>chriscustomer</Name>
</Owner>
<Entries>
<Entry><Permission>FULL_CONTROL</Permission>
<Scope type=UserById>
<ID>a9a7b886d6fd24a52fe8ca5bef65f89a64e0193f23000e241bf9-
b1c61be666e9</ID>
<Name>chriscustomer</Name>
</Scope>
</Entry>
<Entry><Permission>FULL_CONTROL</Permission>
<Scope type=UserById>
```

```
<ID>79a59df900b949e55d96a1e698fbacedfd6e09d98eacf8f8d52-
18e7cd47ef2be</ID>
<Name>Frank</Name>
</Scope>
</Entry>
<Entry><Permission>FULL_CONTROL</Permission>
<Scope type=UserById>
<ID>de019164ebb0724ff67188e243eae9ccbebdde523717cc312255-
d9a82498e394a</ID>
<Name>Jose</Name>
</Scope>
</Entry>
<Entry><Permission>READ</Permission><Scope type=AllUsers>
</Entry>
</Entries>
</AccessControlList>
```

An ACL 118 can be updated, for example by a principal with FULL_CONTROL of the associated bucket or object (412). In some examples, a client must read, modify, and write an ACL 118 in order to update an ACL 118. In this example, the ACL 118 is served (410) as part of modification (412). In some implementations, a client application 103 can send ACL update requests to the hosted storage system 120.

Figure 5:
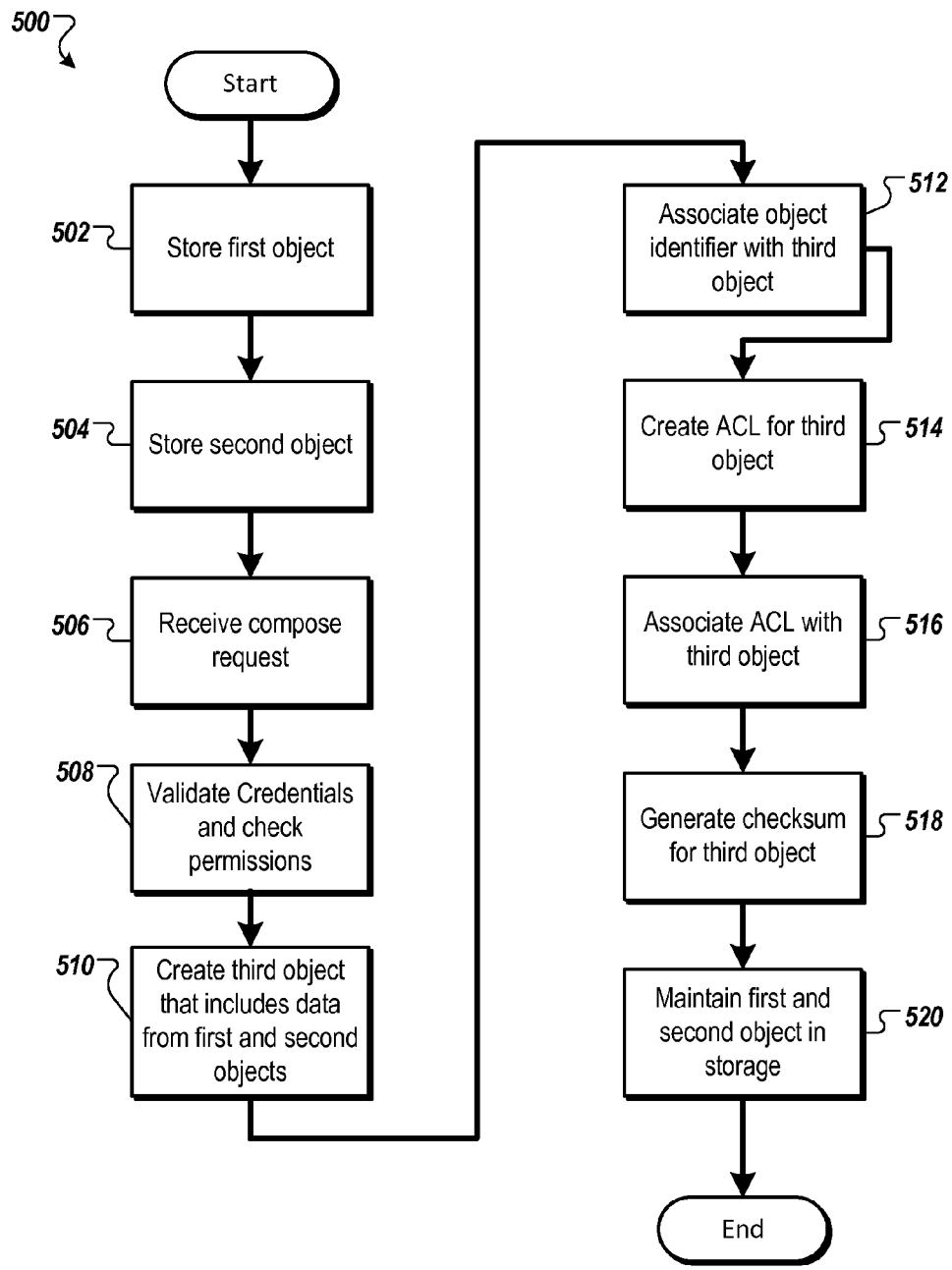
FIG. 5 is a flow chart showing an example of a process for composing data objects stored in a hosted storage system.

FIG. 5 is a flow chart showing an example of a process 500 for composing data objects stored in a hosted storage system. The process can be performed by, for example, the interface frontend 106 and the interface backend 108, and for clarity of presentation, the description that follows uses the system 100 as the basis for describing the process. However, another system, or combination of systems, may be used to perform the process 500.

The hosted storage system 120 stores a first object (502). As described above, the first object may have a data component stored in storage backend 110 and a metadata component stored as part of metadata 116. The metadata component may include an access control list for the first object. An object identifier in the hosted storage system's namespace may uniquely identify the first object in the hosted storage system and enable the first object to be retrieved by a client system 102 over the network 104. The first object identifier may be a bucket name and an object name. The first object may be a newly stored object that has not been composed from other objects, or may be a composite object. A checksum may have been generated from the first object's data component using a checksum function and associated with the first object by being stored as part of the first object's metadata component. The checksum may be, for example, a composable checksum.

The hosted storage system 120 stores a second object (504). Similar to the first data object, the second object may have a data component stored in storage backend 110 and a metadata component stored as part of metadata 116. The metadata component may include an access control list for the second object. An object identifier in the hosted storage system's namespace may uniquely identify the second object in the hosted storage system and enable the second object to be retrieved by a client system 102 over the network 104. The second object identifier may be a bucket name and an object name. The second object may be a newly stored object that has not been composed from other objects, or may be a composite object. A checksum may have been generated from the second object's data component using a checksum function and associated with the second object by being stored as part of the second object's metadata component. The checksum may be, for example, a composable checksum.

The hosted storage system receives a compose object request from the client system 102 (506). For example, the compose object request may be an HTTP PUT or POST request that indicates a compose operation, and designates the first object identifier, a second object identifier, and a third object identifier. The third object identifier may indicate a bucket name for storing the composite object and an object name for the composite object. The compose object request may also implicitly or explicitly designate an access control list for the new composite object, and may implicitly or explicitly designate an order for the first and second object identifiers. The compose request may also include authentication credentials.

The interface backend 108 can examine and validate the authentication credentials and then check to insure that the principal indicated by the credentials has the appropriate permissions (508). For example, the credentials may be validated and then the interface backend 108 can query the target bucket's ACL to determine if the authenticated principal is permitted to create an object in the bucket. For instance, the interface backend 108 may query the ACL associated with the bucket designated by the bucket name included in the third identifier. In addition, the interface backend 108 can query the ACLs for the component objects (in this example, the first object and the second object) to determine if the principal is permitted to read those objects. If the principal is not authorized to create an object in the target bucket, or is not authorized to read the component objects, the request is denied.

Otherwise, in response to receiving the compose object request, the hosted storage system 120 creates a third object that includes the data component of the first object and the data component of the second object (510) and associates the third object identifier with the newly created object (512). For example, the hosted storage system 120 may use the first object identifier and the second object identifier to determine the locations of the data component of the first object and the data component of the second object, respectively, in the storage backend 110. The data components may then be retrieved from the storage backend and the new (third) object can be created by concatenating the data components in the order designated by the compose object request to create a data component for the new object. That data component for the new object is then stored in the storage backend 110. A metadata component for the third object may be created and include an association between the third object identifier and the location of the third object's data component. The metadata component may be stored as part of metadata 116.

In other implementations, rather than retrieving the data components and concatenating them into a new object, snapshotting and reference counting can be used to create composite objects. In this case, for example, the hosted storage system 120 may store only a single copy of an object's data component, and use references that point to the data component for any given "copy" of the data object. When a "copy" of the data object is deleted, the metadata and reference for that copy is deleted, but as long as a reference to the data component exists in the system, the copy of the data component is maintained. Once all references to the data component are deleted, the data component may be deleted.

As an example, when a user first uploads a data object, the data component is stored in the system 120 and a first reference to the data component is generated and used for operations related to this initial copy of the data object. To create a "copy" of the data object, the system creates a second reference to the data component that is used for this second copy of the data object. If the user deletes the initial copy, the first reference is deleted but the data component is maintained because the second reference is still used. Once all "copies" are deleted (so there are no references), the data component is deleted from the system.

In such an implementation, the third object that "contains" the data components of the composite objects may be created through metadata operations, rather than actually duplicating data bytes in the hosted storage system 120. For instance, the hosted storage system 120 may use the first object identifier and the second object identifier to determine the references to the data component of the first object and the data component of the second object in the storage backend 110. The references then may be used by the hosted storage system to "copy" the data components by creating new references to the first data component and the second data component. A metadata component for the third object may then be generated and include the new references to the first and second data components and an association between the third object identifier and the new references. In addition, the compose request may have designated an order for the first data object and the second data object in the third object, and the metadata component may designate an order for the new references that coincides with the order designated in the compose request. When a client system sends a request to access the third object, the third object identifier is used to determine the new references to the first and second data components and the proper order of these components. The new references and the order are used to properly read out the first and second data components and send them to the client system.

If the third data object is deleted, then the new references to the first and second data components are deleted but the first and second data components are maintained as long as there are other references to these components in the system 120. Similarly, if the first and second objects are deleted, the original references to the first and second data components are deleted, but the first and second data components are maintained as long as there are other references to the first and second data components (such as those used for the third object).

Using snapshotting and reference counting may avoid duplicating data bytes in the storage system, and result in a compose operation being entirely a metadata operation. As a result, composing objects, even those with sizes on the order of gigabytes, may be performed with speeds on the order of seconds, rather than hours. Furthermore, this may result in a more efficient use of the storage space in the hosted storage system 120.

The hosted storage system 120 creates the ACL designated by the compose object request (514) and associates the created ACL with the third object (516). For instance, if a canned or explicitly defined ACL is included in the compose object request, the hosted storage system 120 may create the ACL as designated by the compose object request and store the ACL as part of the metadata component for the third object. If the compose object request does not designate an ACL, the hosted storage system 120 may create a default ACL and store the default ACL as part of the third object's metadata component.

A checksum is generated for the third object and associated with the third object (518). For instance, when composable checksums are associated with the first and second objects, a checksum for the third object is generated based on the checksums associated with the first and second objects. The third object's checksum can then be associated with the third object by storing the checksum in the third object's metadata component. In other implementations, a composable or non composable checksum function may be applied directly to the third object's data component to generate a checksum.

In certain cases, after the third object is created, the hosted storage system 120 maintains storage of the first and second objects (520). In other words, the hosted storage system 120 doesn't delete the first and second objects once the third object is created, but stores the first and second objects in the same location and form as before the third object was created. In this case, the hosted storage system 120 may rely on the client system 120 to delete component objects once a composite object is created.

The hosted storage system 120 may maintain storage of the first and second objects when the third identifier is not the same as either the first identifier or the second identifier. However, in implementations in which the hosted storage system 120 allows a composite object to overwrite other objects, including component objects, the third object may overwrite the first or second object when the third object identifier is the same as the first or second object identifier. For example, the third object identifier may be the same as the first object identifier and, as a result, the hosted storage system 120 may overwrite the first object with the third object.

Similarly, the third object may overwrite an object other than the first or second objects. For instance, the third object identifier may be the same as a fourth object identifier for a fourth object, with the fourth object being stored in the hosted storage system before the third object is created. In this case, the hosted storage system 120 may overwrite the fourth object with the third object. In such a situation the hosted storage system 120 may maintain the storage of the first and second objects.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a microdrive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method for composing an object stored in a hosted storage system that includes a namespace that contains object identifiers for objects stored in the hosted storage system, the method comprising:

storing, at the hosted storage system, a first object, the first object including a first data component, wherein a first object identifier in the namespace uniquely identifies the first object in the hosted storage system and enables the first object to be retrieved by a client system over a network;

storing, at the hosted storage system, a second object, the second object including a second data component, wherein a second object identifier in the namespace uniquely identifies the second object in the hosted storage system and enables the second object to be retrieved by a client system over a network;

receiving, at the hosted storage system, a compose object request sent by a client system over a network to the hosted storage system, the compose object request comprises i) a first field for identifying one object to be composed, wherein the first field contains the first object identifier, ii) a second field for identifying another object to be composed, wherein the second field contains the second object identifier, and iii) a third field for identifying the resulting composite object, wherein the third field also contains the first object identifier;

in response to receiving the compose object request, determining i) that the first field contains the first object identifier and ii) that the third field also contains the first object identifier; and in response to determining i) that the first field contains the first object identifier and ii) that the third field also contains the first object identifier:

creating, in the hosted storage system, a third object that includes the first data component and the second data component without duplicating the first data component and the second data component in the hosted storage system by appending the second data component to the end of the first data component; and associating, in the hosted storage system, the first object identifier with the third object such that the first object identifier no longer enables the first object to be retrieved by a client system over a network and instead the first object identifier uniquely identifies the third object in the hosted storage system and enables the third object to be retrieved by a client system over a network.

2. The method of claim 1 wherein creating the third object without duplicating the first data component and the second data component in the hosted storage system includes generating metadata that includes a first reference to the first data component and a second reference to the second data component.

3. The method of claim 2 wherein:
the compose request designates an order for the first data object and the second data object in the third object; and
the metadata designates an order for the first reference and the second reference that coincides with the order designated in the compose request.

4. The method of claim 1 comprising maintaining storage of the first object and the second object after creating the third object.

5. The method of claim 4 comprising:
storing, at the hosted storage system, a fourth object, the fourth object including a fourth data component, wherein a fourth object identifier in the namespace uniquely identifies the fourth object in the hosted storage system and enables the fourth object to be retrieved by a client system over a network; and
after creating the third object:
receiving, at the hosted storage system, an additional compose object request sent by a client system over a network to the hosted storage system, the compose object request designating the first object identifier, the fourth object identifier, and a fifth object identifier in the namespace;
in response to receiving the additional compose object request, creating, in the hosted storage system, a fifth object that includes the first data component and the fourth data component; and
associating, in the hosted storage system, the fifth object identifier with the fifth object such that the fifth object identifier uniquely identifies the fifth object in the hosted storage system and enables the fifth object to be retrieved by a client system over a network.

6. The method of claim 4 comprising:
storing, at the hosted storage system, a fourth object, the fourth object including a fourth data component, wherein a fourth object identifier in the namespace uniquely identifies the fourth object in the hosted storage system and enables the fourth object to be retrieved by a client system over a network; and
after creating the third object:
receiving, at the hosted storage system, an additional compose object request sent by a client system over a network to the hosted storage system, the compose object request designating the third object identifier, the fourth object identifier, and a fifth object identifier in the namespace;
in response to receiving the additional compose object request, creating, in the hosted storage system, a fifth object that includes the first data component, the second data component, and the fourth data component; and
associating, in the hosted storage system, the fifth object identifier with the fifth object such that the fifth object identifier uniquely identifies the fifth object in the hosted storage system and enables the fifth object to be retrieved by a client system over a network.

7. The method of claim 1 wherein the first object is associated with a first checksum generated using a composable function and the second object is associated with a second checksum generated using the composable function, the method comprising:
generating a third checksum for the third object based on the first checksum and the second checksum; and
associating the third checksum with the third object.

8. The method of claim 1 wherein the third object identifier is the same as a fourth object identifier for a fourth object, the fourth object being stored in the hosted storage system before the third object is created, the method comprising overwriting the fourth object with the third object.

9. The method of claim 1, wherein the first object is a "year to date" log and the second data object is a daily log.

10. A non-transitory computer storage medium storing a computer program, the program comprising instructions that, when executed by one or more processing devices, cause the one or more processing devices to perform a process for composing an object stored in a hosted storage system that includes a namespace that contains object identifiers for objects stored in the hosted storage system, the process comprising:
storing, at the hosted storage system, a first object, the first object including a first data component, wherein a first object identifier in the namespace uniquely identifies the first object in the hosted storage system and enables the first object to be retrieved by a client system over a network;
storing, at the hosted storage system, a second object, the second object including a second data component, wherein a second object identifier in the namespace uniquely identifies the second object in the hosted storage system and enables the second object to be retrieved by a client system over a network;
receiving, at the hosted storage system, a compose object request sent by a client system over a network to the hosted storage system, the compose object request comprises i) a first field for identifying one object to be composed, wherein the first field contains the first object identifier, ii) a second field for identifying another object to be composed, wherein the second field contains the second object identifier, and iii) a third field for identifying the resulting composite object, wherein the third field also contains the first object identifier;
in response to receiving the compose object request, determining i) that the first field contains the first object identifier and ii) that the third field also contains the first object identifier; and
in response to determining i) that the first field contains the first object identifier and ii) that the third field also contains the first object identifier:
creating, in the hosted storage system, a third object that includes the first data component and the second data component without duplicating the first data component and the second data component in the hosted storage system by appending the second data component to the end of the first data component; and
associating, in the hosted storage system, the first object identifier with the third object such that the first object identifier no longer enables the first object to be retrieved by a client system over a network and instead the first object identifier uniquely identifies the third object in the hosted storage system and enables the third object to be retrieved by a client system over a network.

11. The computer storage medium of claim 10, wherein creating the third object without duplicating the first data component and the second data component in the hosted storage system includes generating metadata that includes a first reference to the first data component and a second reference to the second data component.

12. The computer storage medium of claim 11 wherein:
the compose request designates an order for the first data object and the second data object in the third object; and
the metadata designates an order for the first reference and the second reference that coincides with the order designated in the compose request.

13. The computer storage medium of claim 10, the process comprising maintaining storage of the first object and the second object after creating the third object.

14. The computer storage medium of claim 13, the process comprising:
storing, at the hosted storage system, a fourth object, the fourth object including a fourth data component, wherein a fourth object identifier in the namespace uniquely identifies the fourth object in the hosted storage system and enables the fourth object to be retrieved by a client system over a network; and
after creating the third object:
receiving, at the hosted storage system, an additional compose object request sent by a client system over a network to the hosted storage system, the compose object request designating the first object identifier, the fourth object identifier, and a fifth object identifier in the namespace;
in response to receiving the additional compose object request, creating, in the hosted storage system, a fifth object that includes the first data component and the fourth data component; and
associating, in the hosted storage system, the fifth object identifier with the fifth object such that the fifth object identifier uniquely identifies the fifth object in the hosted storage system and enables the fifth object to be retrieved by a client system over a network.

15. The computer storage medium of claim 13, the process comprising:
storing, at the hosted storage system, a fourth object, the fourth object including a fourth data component, wherein a fourth object identifier in the namespace uniquely identifies the fourth object in the hosted storage system and enables the fourth object to be retrieved by a client system over a network; and
after creating the third object:
receiving, at the hosted storage system, an additional compose object request sent by a client system over a network to the hosted storage system, the compose object request designating the third object identifier, the fourth object identifier, and a fifth object identifier in the namespace;
in response to receiving the additional compose object request, creating, in the hosted storage system, a fifth object that includes the first data component, the second data component, and the fourth data component; and
associating, in the hosted storage system, the fifth object identifier with the fifth object such that the fifth object identifier uniquely identifies the fifth object in the hosted storage system and enables the fifth object to be retrieved by a client system over a network.

16. The computer storage medium of claim 10 wherein the first object is associated with a first checksum generated using a composable function and the second object is associated with a second checksum generated using the composable function, the process comprising:
generating a third checksum for the third object based on the first checksum and the second checksum; and
associating the third checksum with the third object.

17. The computer storage medium of claim 10 wherein the third object identifier is the same as a fourth object identifier for a fourth object, the fourth object being stored in the hosted storage system before the third object is created, the process comprising overwriting the fourth object with the third object.

18. The computer storage medium of claim 10, wherein the first object is a "year to date" log and the second data object is a daily log.

19. A computer system comprising:
a hosted storage system comprising a processor and computer memory and configured to:
store a first object, the first object including a first data component, wherein a first object identifier in the namespace uniquely identifies the first object in the hosted storage system and enables the first object to be retrieved by a client system over a network;
store a second object, the second object including a second data component, wherein a second object identifier in the namespace uniquely identifies the second object in the hosted storage system and enables the second object to be retrieved by a client system over a network
receiving, at the hosted storage system, a compose object request sent by a client system over a network to the hosted storage system, the compose object request comprises i) a first field for identifying one object to be composed, wherein the first field contains the first object identifier, ii) a second field for identifying another object to be composed, wherein the second field contains the second object identifier, and iii) a third field for identifying the resulting composite object, wherein the third field also contains the first object identifier;
in response to receiving the compose object request, determining i) that the first field contains the first object identifier and ii) that the third field also contains the first object identifier; and
in response to determining i) that the first field contains the first object identifier and ii) that the third field also contains the first object identifier:
creating, in the hosted storage system, a third object that includes the first data component and the second data component without duplicating the first data component and the second data component in the hosted storage system by appending the second data component to the end of the first data component; and
associate the first object identifier with the third object such that the first object identifier no longer enables the first object to be retrieved by a client system over a network and instead the first object identifier uniquely identifies the third object in the hosted storage system and enables the third object to be retrieved by a client system over a network; and
the client system comprising a processor and computer memory and configured to:
send, to the hosted storage system, the compose object request.

20. The system of claim 19 wherein to create the third object without duplicating the first data component and the second data component in the hosted storage system, the hosted storage system is configured to generate metadata that includes a first reference to the first data component and a second reference to the second data component.

21. The system of claim 20 wherein:
the compose request designates an order for the first data object and the second data object in the third object; and
the metadata designates an order for the first reference and the second reference that coincides with the order designated in the compose request.

22. The system of claim 19 wherein the hosted storage system is further configured to maintain storage of the first object and the second object after creating the third object.

23. The system of claim 22 wherein the hosted storage system is further configured to:
store a fourth object, the fourth object including a fourth data component, wherein a fourth object identifier in the namespace uniquely identifies the fourth object in the hosted storage system and enables the fourth object to be retrieved by a client system over a network; and
after creating the third object:
receive an additional compose object request sent by a client system over a network to the hosted storage system, the compose object request designating the first object identifier, the fourth object identifier, and a fifth object identifier in the namespace;
create, in response to receiving the additional compos object request, a fifth object that includes the first data component and the fourth data component; and
associate the fifth object identifier with the fifth object such that the fifth object identifier uniquely identifies the fifth object in the hosted storage system and enables the fifth object to be retrieved by a client system over a network.

24. The system of claim 22 wherein the hosted storage system is further configured to:
store a fourth object, the fourth object including a fourth data component, wherein a fourth object identifier in the namespace uniquely identifies the fourth object in the hosted storage system and enables the fourth object to be retrieved by a client system over a network; and
after creating the third object:
receive an additional compose object request sent by a client system over a network to the hosted storage system, the compose object request designating the third object identifier, the fourth object identifier, and a fifth object identifier in the namespace;
create, in response to receiving the additional compose object request, a fifth object that includes the first data component, the second data component, and the fourth data component; and
associate the fifth object identifier with the fifth object such that the fifth object identifier uniquely identifies the fifth object in the hosted storage system and enables the fifth object to be retrieved by a client system over a network.

25. The system of claim 19 wherein the first object is associated with a first checksum generated using a composable function and the second object is associated with a second checksum generated using the composable function, the hosted storage system configured to:
generate a third checksum for the third object based on the first checksum and the second checksum; and
associate the third checksum with the third object.

26. The system of claim 19 wherein the third object identifier is the same as a fourth object identifier for a fourth object, the fourth object being stored in the hosted storage system before the third object is created, the hosted storage system configured to overwrite the fourth object with the third object.

27. The system of claim 19, wherein the first object is a "year to date" log and the second data object is a daily log.

* * * * *